Oct. 25, 1966     R. R. FORESMAN, JR     3,281,823
VOTE INDICATOR SYSTEM
Filed April 24, 1964     2 Sheets-Sheet 1
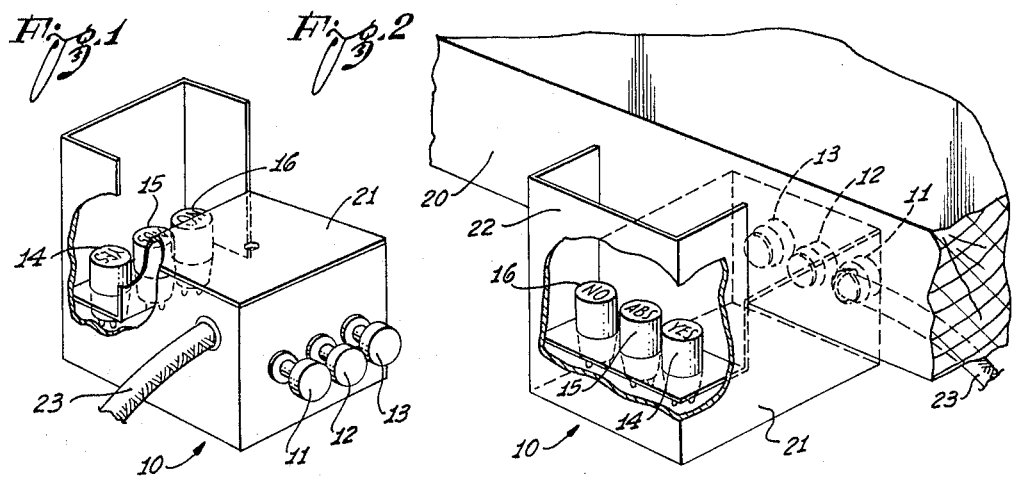
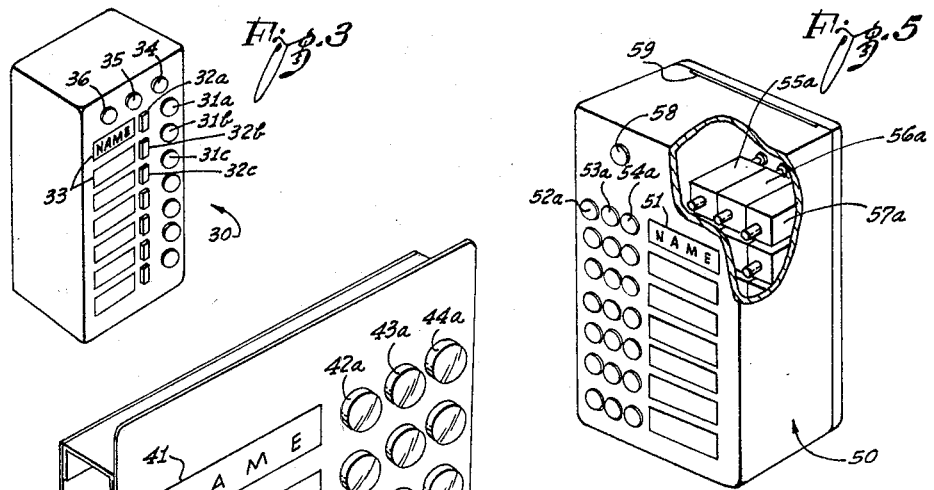
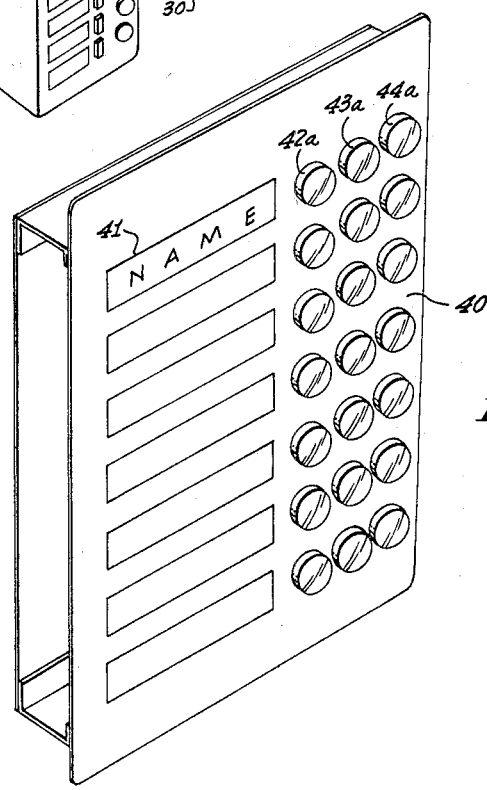
INVENTOR
ROBERT R. FORESMAN, JR.
By Smyth, Roston & Pavitt
Attorneys Oct. 25, 1966  R. R. FORESMAN, JR  3,281,823
VOTE INDICATOR SYSTEM
Filed April 24, 1964  2 Sheets-Sheet 2

INVENTOR
ROBERT R. FORESMAN, JR.
By Smyth, Roston & Pavitt
Attorneys

United States Patent Office 3,281,823
Patented Oct. 25, 1966

3,281,823
VOTE INDICATOR SYSTEM
Robert R. Foresman, Jr., 650 W. 12th St.,
Claremont, Calif.
Filed Apr. 24, 1964, Ser. No. 362,313
15 Claims. (Cl. 340—332)

The present invention relates to a vote indicator system, which may include a vote display system as well as a recording system for the votes cast and displayed. The system that is the subject of the present invention includes several features cooperating in a unique manner to establish a novel system for the display and, optionally, for the recording of a vote made by each member in complete privacy.

One of the disadvantages in the known automatic or electric voting systems or in the taking of a vote without electrical equipment is that, prior to the counting of the vote but subsequent to the roll call or the call for the vote, the voting members can see how other members have voted or seem to intend to vote. Thus, a voting member who decides rather late how to vote may have his decision influenced by the vote of other members, or he may suddenly decide to vote along with the majority. In other words, it is detrimental to the objectivity of the voting result if a voting member is given the opportunity to observe how other members have voted before he casts his own vote. The smaller the voting assembly is, the stronger the outside influence will be.

It is an object of the present invention to provide a system in which each vote is cast in complete privacy. It is another object of the present invention to provide a vote indicator system that permits coordinated vote display and recording, although the voting itself is totally uncoordinated as to time, location, choice, and sequence.

It is a further object of the invention to relieve the last voting member subject to a roll call vote of the unenviable position of deciding the issue when the vote has come down to him as a tie vote.

Features of the invention include equipment that permits each voting member to cast his vote at any time during the discussion of a particular point on the agenda; the equipment permits each member to change his vote as often as he wishes during the discussion period and without giving public notice as to such a change; it permits the chairman or speaker of the assembly and/or the record clerk to maintain complete control over the proceedings— particularly as to the completion of discussion, of voting, and of recording thereof—so that each point on the agenda can be covered without loss of time on technicalities.

The vote will be displayed publicly as well as recorded as soon as the completion of the voting is apparent to the chairman. Conversely, the system permits each voting member to cross-check his vote with the one that is being displayed and prior to recording thereof, and he can register objection in case, for example, there appears to be a discrepancy due to a circuit failure. The system further permits short-cutting of the discussion if it becomes apparent to the chairman that all members have, in fact, already voted, even though the discussion appears to continue for some time.

The system presently suggested as a preferred embodiment of the invention includes a number of vote units, each one being assigned to a voting member and installed adjacent to his seat, for example, right in front of him at the council table. Since each voting member has a voting unit assigned to him, it is required that such a unit be available only to him. The physical location of the voting unit is unimportant, and as long as his voting unit is hooked up to the main circuit, the voting member may, for example, vote from a hospital bed.

Each such vote unit is equipped with a number of vote switches that are not visible to anyone but the voting member himself; he has to grip around the unit to actuate the switches, which are more or less hidden in the back of the unit. Preferably, there are as many different switches as there are possible voting choices and decisions—to wit, an affirmative, aye, or "yes" vote switch; a disaffirmative, nay, or "no" vote switch; and an undecided, or abstentious vote switch. Each vote unit is further equipped with a number of inconspicuously placed lamps, for example, sunken lamps hidden by a shield from everyone but the voting member himself, and each such lamp lights up when one of the vote switches is pressed to indicate clearly to the voting member how he has voted, so that he can establish and verify full agreement between his intention to vote and the vote switch that he actually pressed.

Voting, in the manner described, basically has a threefold effect. First, the pressing of any vote switch is indiscriminately indicated at a specific panel. This panel merely shows that this particular member has voted, but it does not register or indicate how he has voted, nor is there any indication as to a subsequent change in his vote. This panel is visible to the chairman, but it is immaterial whether it is visible to anybody else.

The second effect of voting by pressing a particular vote switch is the preparation of an illuminating device capable of conspicuously and publicly displaying the vote of each voting member. However, the vote will not be displayed publicly at the moment when a member presses a vote switch of his unit. The system is designed to store the votes as cast until after all voting members have voted. Accordingly, the above-mentioned chairman's panel is equipped with a master control switch that governs the energization of the publicly visible display device; this illuminating device indicating the individual votes will not be energized until the chairman has pressed this master control switch. He will press the switch as soon as all members have voted, which fact is noticed by the chairman, since he observes his indicating panel. Preferably, the chairman will announce his intention to display the vote.

Thirdly, and concurrently with the display device, a recording device is being prepared for recording the vote as finally cast by each voting member. Preferably, this voting unit can be activated only after the vote has been displayed publicly.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

FIG. 1 illustrates a perspective view of a single-vote unit;

FIG. 2 illustrates a perspective view of a similar unit, but from a different direction, and as it is attached to a council table;

Figure 6:
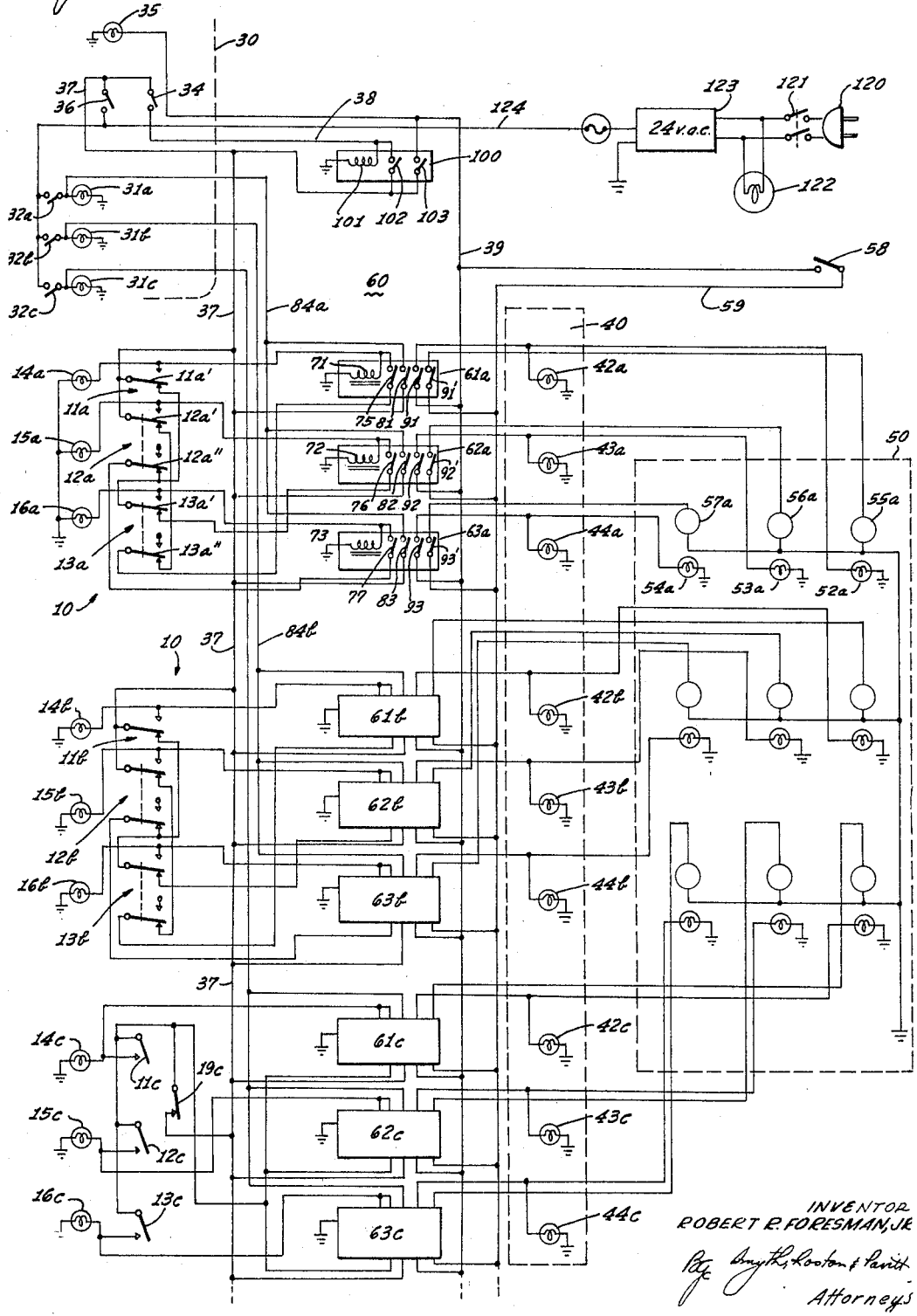

FIGS. 3, 4, and 5 illustrate perspective views of several display and control units that form the preferred embodiment of the inventive voting system; and FIG. 6 illustrates schematically a circuit diagram of the electrical interconnection of the units shown in FIGS. 3, 4, and 5 with several units of the type shown in FIGS. 1 and 2.

Proceeding now to the detailed description of the drawings, the several units employed will be described first in general and with reference to FIGS. 1 through 5.

FIGS. 1 and 2 illustrate somewhat schematically a single vote unit 10 suitably attached to a table 20 and at the space assigned to a voting member of a board or of a council, etc. The single vote unit comprises a housing 21, from which three push buttons 11, 12, and 13 are projecting. These push buttons are positioned so that they are not visible to any other voting member sitting at table 20 or to any person in the audience, etc.

For example, button 11 may be the "aye" or "yes" button; button 12 may be the "abstain" button, and button 13 may be called the "nay" or "no" button. From this designation, it is apparent that the voting member will press the correspondingly named button in order to register his vote.

These vote buttons constitute the actuating portion of vote switches, to be described more fully below with reference to FIG. 6. The pressing of the several buttons will be registered by lamps 14, 15, and 16 respectively, assigned to and operated by vote switch buttons 11, 12, and 13. As will become more apparent below, any of these lamps will light up either until another vote switch is actuated or until the entire device is reset for a new voting sequence. Lamps 14, 15, and 16 are inconspicuously positioned and hidden in a well, positioned so that only the voting member is capable of observing these lamps. Accordingly, there is provided a shield 22 severely restricting the range from which these lamps 14, 15, and 16 can be observed. In particular, these lamps are hidden from view in the council room, so that once one of the buttons has been pressed, no one but the voting member himself can observe the immediate result of his voting as reflected in the electric circuit network. As shown schematically, lamps 14, 15, and 16 may bear the words "yes," "abst.," and "no" as opaque inscriptions. Additionally or alternatively, the lamps may be colored. For example, lamp 14 may be green, lamp 15 may be a neutral color such as white, and lamp 16 may be red.

A cable 23 runs from and through this housing 21 to interconnect this particular vote unit with other units, to be described later on.

Proceeding now to the description of FIG. 3, there is shown in perspective view a control unit 30 that may be positioned in front of the chairman or the speaker of the voting assembly. The control unit 30 comprises a housing a panel that shows a column 31 of lamps such as 31a, 31b, 31c, etc. To the left of each such lamp is a column 32 of toggle or slide button switches such as 32a, 32b, 32c etc., and to the left therefrom are name plates such as 33. Accordingly, each voting member has assigned to him such a plate bearing his name, and the lamp to the right of his name plate is to indicate whether he has voted at all. As will be developed more fully below, a lamp such as 31a will light up when the respective voting member has voted in any manner, but this lamp does not indicate how he has voted.

Switch 32a, also associated with this voting member, serves independently to light up the lamp assigned to him. The purpose of this switching arrangement can be briefly outlined as follows. During a roll call, the voting members who are present will vote, i.e., press a specific button of their respective voting unit, and the specific lamps of row 31 that represent the members present will light up. Those who are absent are then identified by the lamps in unit 30 that remain dark. After recording the result of the roll call, in a manner also outlined more fully below, the chairman, having unit 30 in front of him, will then press the switches 32 whose respective lamps 31 have remained dark. Thereupon these lamps will also go on. Throughout the subsequent voting procedures, these latter lamps will remain on, but the specific lamps of row 31 associated with the voting members present will be extinguished after the completion of each voting routine, and they will individually go on again with each new vote as cast by the members present. Since the lamps of the absent members stay on, the completion of voting on each measure will always be indicated by a lighting up of the entire column of lamps 31, and the chairman or speaker does not have to memorize who of the members are absent in order to determine the completion of voting.

The control unit 30 furthermore includes a switch 34 designed to enable the chairman or speaker to energize a vote display panel (infra) after each member of the board or council has voted. Lamp 35 serves to signal proper response of the actuation of switch 34. Push-button switch 36 controls the power supply to most display lamps of the entire system, and it serves the need to nullify and erase the result of any voting from the system and to prepare the system for a new voting procedure. The pressing of push-button switch 36 extinguishes also those lamps of row 31 associated with the members who are present.

FIG. 4 illustrates a front view of the vote-result display panel 40 already mentioned above. This vote-result display panel is conspicuously placed and positioned in the room in which the meeting is being held. The purpose of display panel 40 is to inform everybody in the room—that is, each one of the voting members and each member of the press and of the general public who is admitted—how each voting member of the board has voted. There are provided name plates 41, and there is a name plate assigned to each voting member accordingly. To the right of each name plate there are provided three lamps such as, for example, 42a, 43a, and 44a. The lamps in the first column may, for example, indicate the "ayes"; the lamps in the second column may indicate vote abstentions, and the lamps in the third column may indicate the "nays."

Preferably, the lamps that directly indicate the voting results, such as, for example, the lamps 42a, 43a, and 44a, in FIG. 4, may also be distinguished by different colors. Again, for example, lamps indicating the "ayes" may be green, the "nays" may be red, and abstentions white. It is believed that, by selecting these colors, it is very easy for an observer to distinguish the "ayes" and the "nays" without having to remember in which particular column the "ayes" and the "nays" are to be registered.

It should be mentioned that the display panel may be of ornamental design and that single, large fluorescent lights outlining the words "YES," "NO," etc., can be used instead. This will depend to some extent on the size of the council room or assembly hall. In the following description, the illumination on the display panel will be referred to simply as "lamps," for purposes of convenience only and without restriction as to the specific illumination employed. In any case, however, it is mandatory that the panel, such as 40, should provide for a conspicuous and illuminated vote display that distinguishes clearly for each member how he has voted.

Proceeding now to FIG. 5, there is illustrated, in top and perspective view, a unit which is assigned, for example, to the record clerk. In small boards or councils, this unit may also be placed in front of or near the chairman, in which case units 30 and 50 may be structurally combined.

This clerk's unit is comprised of a housing, and it bears three columns of lamps, only one lamp of each column having been designated by a reference numeral. In this case, numerals 52a, 53a, and 54a denote three lamps positioned beside a name plate 51. The columns of lamps should correspond directly to the three columns of lamps of the display panel 40 shown in FIG. 4. This unit is specifically destined to print a record of the vote, and/or give the recording clerk a visual record of the votes cast. For each voting member, there is provided a set of three solenoids, such as 55a, 56a, and 57a, the respective plungers of which bear porous rubber stamps or the like. The rubber stamps may comprise stencils showing letters or words indicating an affirmative, rejective, or abstentious vote. Thus, upon completion of the vote and the display thereof, a record can be obtained automatically in that one of the three solenoids assigned to each voting member is energized and a permanent record is prepared of this particular vote.

There is provided a printing control switch 58 governing the final energization of all the solenoids. The voting as carried out by each voting member does, in fact, prepare a solenoid, one for each voting choice; and after completion of the voting and on command of the chairman, the clerk presses the push button 58 and thereby energizes the prepared solenoids, and a permanent record is prepared. As will be developed more fully below, there is a clear association of any one vote switch in any vote unit with one lamp in panel 40, one lamp in unit 50, and one solenoid also in unit 50.

Reference numeral 59 indicates schematically a card or a tape or the like upon which the record is being made. After printing, i.e., upon the release of the printing switch 58, the clerk may take card 59 out of the unit and compare it with the illumination on his own panel (lamps such as 52a, 53a, etc.) so as to check whether a proper record has indeed been produced.

It will readily be appreciated that printing is not a mandatory mode of preparing a permanent record of the votes, but any other known method of preparing a record of such a nature can be used. This unit may well incorporate means for encoding which permit the processing of the record later on by data-processing devices.

Having described in general the various units to be employed in the inventive voting system, the circuit diagram shown in FIG. 6 illustrates how all of these units are interconnected for cooperation.

In particular, FIG. 6 illustrates at the left-hand side thereof the three voting units, respectively identified by suffix letters a, b, and c succeeding the reference numerals employed to identify the several circuit elements in each vote unit. At the top left corner of the drawing, there is illustrated the circuit diagram of the control unit 30, and in the center there is illustrated a power and circuit energizing unit 60. This power and circuit energizing unit may be installed in a separate housing; and since this unit does not have to be equipped with any indicating lamps, the specific positioning of this unit is immaterial, and it can be installed as a fixture anywhere in the assembly room. Alternatively, this power and circuit energizing unit may be structurally incorporated in the vote-result panel 40, in the control unit 30, or in the recording unit 50.

For simplification only three vote units are being illustrated, but it will become more apparent below that the number of vote units employed is entirely immaterial for the inventive system, and the connection of additional units can readily be made by those skilled in the art.

Proceeding now with the description of the circuit network in one particular vote unit and the specific circuit elements it controls and which are positioned in the power and circuit energizing unit, reference is made to the first unit identified by suffix letter a. There are illustrated in the circuit diagram the three lamps 14a, 15a, and 16a, which are mounted inconspicuously in the vote unit so as to be visible only to the voting member who has this unit assigned to him. There are shown the three voting switches 11a, 12a, and 13a, already mentioned above. These switches are of the momentary action type; i.e., they are changed from their normal contact relationship to a second contact relationship only when being pressed. Upon release, they return to their normal and initial contact relationship, as illustrated. Switch 11a has only one blade 11a', but switches 12a and 13a each have two blades respectively, denoted with reference numerals 12a', 12a'', and 13a', 13a''. Each such blade can alternatingly make contact with two stationary contacts.

In the position illustrated, it can be seen that neither one of the contact blades makes contact with a stationary switching contact that is connected to any of the lamps 14a, 15a, and 16a. Lamps 14a, 15a, and 16a are permanently grounded with one terminal each, while the other terminals of each lamp are respectively governed by switching blades 11a', 12a', and 13a'. Additionally, these second terminals of each of these lamps 14a, 15a, and 16a are respectively connected to relays 61a, 62a, and 63a at the outside. Relays 61a, 62a, and 63a may pertain to the power and energizing unit 60.

It should be mentioned that relays such as 61a, 62a, and 63a could be placed in the housing of the respective vote unit, in which case no separate power unit 60 would be needed. However, from the standpoint of size, it is advisable to make the vote units as small as possible. For this reason, such vote units should contain only switches and lamps.

Lamp 14a is connected to the energizing coil 71 of relay 61a, lamp 15a is connected to the energizing coil 72 of relay 62a, and lamp 16a is connected to the energizing coil 73 of relay 63a. The respective other sides of the energizing relay coils 71, 72, and 73 are grounded, so that lamps and relay coils are connected in parallel, and their power supply is respectively governed by the switching blades 11a', 12a', and 13a', respectively. Each one of the relays 61a, 62a, and 63a is equipped with four operating blades, including a holding blade, respectively denoted with reference numerals 75, 76, and 77. The holding blade 75 of relay 61a is connected directly to the blade 13a''. The holding blade 76 of relay 62a is connected directly to a stationary contact that is engaged by the blade 13a' when the vote switch 13a is not activated. The holding blade 77 is connected directly to the blade 12a''.

Power is applied to the vote unit presently described as well as to all other vote units through a line 37, receiving a voltage in a manner which will be described more fully below, but it can be mentioned that the application of power to line 37 is governed by switch 36. Line 37 has a connection to the vote unit presently described that leads directly to the blade 11a' and to the blade 12a' to apply power to this vote unit.

The circuit connection as described thus far serves the following purpose. Assuming that vote switch 11a is being pressed, it will be recalled that this actuation serves to register an affirmative vote by the voting member having assigned to him this particular vote unit. Thus, while pressing the vote switch 11a, the blade 11a' thereof applies the potential derived from line 37 to lamp 14a and to the coil 71 of relay 61a. The relay coil 71 is thus being energized, and it closes its contacts. Only one such contact has been described thus far, which is the contact of the holding circuit 75. The holding circuit for relay 61a is now established through the following connections: line 37, unactivated blade 12a', unactivated blade 13a'', contact 75 to coil 71. It is thus apparent that any subsequent activation of either vote switch 12a or of vote switch 13a interrupts this holding circuit for relay 61a.

Assuming that switch 12a is being activated (with or without prior activation of switch 11a), then the potential of line 37 is being applied through blade 12a' to lamp 15a as well as to coil 72 of relay 62a. Relay 62a responds and closes its holding circuit through blade 76, now receiving power through the unactivated blade 13a' and through the unactivated blade 11a', which is directly connected to line 37. Any subsequent actuation either of vote switch 11a or of vote switch 13a interrupts the holding circuit for relay 62a.

Assuming that switch 13a is being activated by the voting member, power is then applied to lamp 16a through activated blade 13a' as well as through unactivated blade 11a', which, in turn, is connected to power line 37. The same potential is applied to coil 73 of relay 63a because relay coil 73 is connected in parallel to lamp 16a. The holding circuit for this relay 63a is established through the closed blade 77 of relay 63a. This holding circuit receives potential through the unactivated blade 12a'' and through the unactivated blade 11a', which establish the series circuit to line 37 for as long as neither one of the vote switches 11a and 12a has been activated. Subsequent activation of either one of these latter two vote switches interrupts the holding circuit for relay 63a.

It will thus be appreciated that a mutual blocking circuit is provided and that, after pressing any of the voting switches 11a, 12a, and 13a for any duration, the respectively associated relay 61a or 62a or 63a will respond and maintain its state of energization, even if the voting switch 11a or 12a or 13a has been released. Also, one of the lamps 14a, 15a, or 16a is on as a reminder to the voting member how he has voted. However, if the voting member changes his mind and activates thereafter a different voting switch, the previously established holding circuit of the previously energized relay is interrupted, and concurrently a new energization circuit and a new holding circuit for another relay are being established. Therefore, only one of the relays 61a, 62a, and 63a at a time can be kept energized and independent from discontinued vote switch actuation.

It should be mentioned that the lamps, such as, for example, lamp 14a, receive power as long as the respectively associated relay, such as 61a, is being energized. The vote switch 11a as well as the holding circuit for relay 61a energizes lamp 14a, so that, when vote switch 11a is released, lamp 14a and relay 61a remain energized. The same holds true for the other lamp-vote-switch-relay combination.

If by accident a voting member presses two of his adjoining voting buttons, he will very soon realize this mistake because he will suddenly see that, for example, the two lamps 14a and 15a or the two lamps 15a and 16a are being energized, and he will, of course, soon release one of the voting buttons which he pressed accidentally. As long as he presses only one voting switch, he sees the result of this switch actuation by the energization of any of the lamps 14a, 15a, and 16a, and the circuit connection made concurrently thereto results in the energization of only the associated one of the relays 61a, 62a, and 63a.

If a voting member presses the two outer switches, 11a and 13a, this can be no accident, but willful tampering. The vote unit prevents this improper use in that only relay 61a will be energized and only lamp 14a will light up, and his vote is registered as an affirmative one unless he releases switch 11a prior to switch 13a.

Proceeding now with the description of the power and circuit energizing unit 60, the three relays such as 61a, 62a, and 63a, which are respectively assigned to the vote unit described, will be explained further. It can be seen that each of these three relays has three additional contact blades, as stated. Relay 61a has a contact blade 81 that is being activated as soon as power is applied to coil 71. There are blades 82 and 83 pertaining to relays 62a and 63a respectively.

The circuits governed by these three blades 81, 82, and 83 are connected in parallel, and as soon as any one of the blades 81, 82, and 83 responds, the voltage from line 37 is being applied to a line 84a. Thus, power is being applied to line 84a in case any one of the three relays 61a, 62a, or 63a is being energized. The potential in line 84a thus signals the fact that the voting member to whom this unit is assigned has in fact voted. However, there is no distinction as to his particular vote as signaled into line 84a.

Line 84a connects to lamp 31a of the control unit 30. Thus, the lighting up of lamp 31a in control unit 30 (see FIG. 3) signals to the chairman, or to whoever is to observe the control unit, that the particular member whose name appears in control unit 30 at the name plate 33 to the left of lamp 31a has, in fact, voted. Of course, lamp 31a will light up only if the switch 32a is open. However, since the particular voting member is presumed to be present, as established by a roll call, switch 32a has not been pressed by the chairman, so that as long as the voting member of unit —a does not vote, lamp 31a is in fact not energized.

It will also be apparent that any change in the voting will not alter the initial energization of lamp 31a. Once the potential of line 37 is applied to line 84a, any further manipulation of the vote switches will not remove such a potential from line 84a. It is thus assured that in case the voting member changes his mind as to the choice of his vote or in case he has accidentally pressed the wrong voting switch, such a fact will not appear as any change in the illumination of lamp 31a.

Each of the relays 61a, 62a, and 63a is equipped with a third operating contact, respectively denoted with reference numerals 91, 92, and 93. These contacts are not connected to any of the circuit elements described thus far. The contact blades 91, 92, and 93 are connected directly to a line 39, to which power is being applied in a manner to be described below. Again it can be said that the application of power to this line 39 is governed by switches 34 and 36 in the control unit.

Blades 91, 92, and 93 respectively govern circuit connections from line 39 to lamps 42a, 43a, and 44a respectively. As will be recalled, lamps 42a, 43a, and 44a are positioned in the display panel illustrated in FIG. 4. Lamps 42a, 43a, and 44a thus directly indicate which one of the relays 61a, 62a, and 63a has been energized— provided that line 39 receives power, which normally is not the case. The relay energization is, of course, an electrical storing of the voting as manifested by the previous pressing of any of the voting switches 11a, 12a, and 13a. Accordingly, blades 91, 92, and 93 govern preparatory circuits for lamps 42a, 43a, and 44a. Only one preparatory circuit at a time can be established for each voting member, and any change thereof is possible but not noticeable to anybody else for as long as line 39 is not energized.

As can be seen from FIG. 6, the second vote unit, including the load switches 11b, 12b, 13b and the hidden lamps 14b, 15b, and 16b, connects to power relays 61b, 62b, 63b in precisely the same manner as was described above with reference to the unit identified by letters succeeded by the character a. There is also provided a line 84b, which, when energized, indicates that any one of the buttons 11b, 12b, 13b has in fact been pressed; and energization of the line 84b reflects an illumination furnished by lamps 31b, provided, of course, that the absentee switch 32b has not been pressed previously. Accordingly, relays 61b, 62b, 63b respectively govern the preparatory circuit for energizing the display lamps 42b, 43b, and 44b assigned to this second voting member.

There is illustrated another vote unit of an alternative design. This particular vote unit can be connected to the remaining circuit network (i.e., to units 30, 40, 50, and 60) in precisely the same manner as the other vote units are connected. The difference in this particular vote unit —c is that after any of the vote switches 11c, 12c, or 13c has been pressed, it is not possible to erase this vote merely by pressing another one of the vote switches, but there is provided an erase switch 19c that has to be activated to erase an erroneous vote. Thus, either one of the switches 11c, 12c, and 13c serves to directly and immediately apply the voltage potential that exists in line 37 to the respective energizing coils of the relays 61c, 62c, 63c. These relays are of precisely the same configuration as described above with reference to relay 61a, etc.

The holding circuits for all these relays 61c, 62c, and 63c are directly governed by switch 19c, and not by any of the switches 11c, 12c, and 13c. The vote-indicating contact blades of relays 61c, etc., are likewise directly connected to a line 84c to indicate whether any of the relays 61c, 62c, or 63c has been energized. This connection follows the pattern outlined above.

The principal difference between the third illustrated vote unit and unit —a described above is to be seen in that the holding circuit for each of the relays 61c, 62c, and 63c is not being governed by any additional blade assigned to any of the voting switches 11c, 12c, and 13c. Therefore, this particular alternate vote unit is of somewhat simpler design, but it requires an additional manipulation by virtue of the provision of the fourth switch 19c, which is designed to govern all of the holding circuits of the relays 61c, 62c, and 63c. Each of the latter relays, of course, governs the preparatory circuit for display lamps 42c, 43c, and 44c in precisely the same manner that is valid for any of the preparatory circuits of the units.

The energization of lamps 42a, 42b, 42c or 43a, 43b, 43c or 44a, 44b, 44c depends on the application of power to line 39 as stated. It is one of the principal purposes of this voting system that during the voting no power is being applied to line 39. Thus, it will be recalled that, for example, the closing of contacts 91 or 92 or 93 serves merely as a preparation for the energization of any of the lamps 42a, 43a, and 44a. The energization of the lamps is dependent on the condition that power is applied to line 39. The application of power to line 39 will occur only after all voting members present have in fact voted. The completion of voting by all the voting members is indicated by the lighting up of all the lamps in column 31 of the control unit 30 positioned in front of the chairman. After all these lamps 31a, 31b, 31c, etc., have lit up, the chairman will announce that the voting is now being completed and that the result of the vote will now displayed (and recorded—infra). He does this indirectly by applying power to line 39 in a manner to be described below and with reference to switch 34.

The control unit 30, as stated above, contains lamps 31a, 31b, 31c, etc., the absentee switches 32a, 32b, 32c, etc., and the main control switches 34 and 36. With these switches 34 and 36, the application of power to any of the systems described thus far and to the clerk's recording unit 50, to be described below, is being controlled.

Specifically, the control of voltage as applied to lines 37 and 39 will now be described. There is provided a voltage supply circuit, which may comprise plug 120 for the mains, a master power switch 121 that is closed before the meeting of the voting members comes to order, a lamp 122 indicating that power is in fact being applied to the voting system, and a voltage transformer 123 that reduces the line voltage of 115 volts, as supplied by the mains, to a suitable level of, for example, twenty-four volts. Elements 120, 121, 122, and 123 may be structurally incorporated in the power unit 60. The output of this transformer 123 is supplied to two terminals, one of which may serve as a ground terminal, and the other transformer output terminal connects to a line 124. Thus, line 124 receives power throughout the operation and as long as switch 121 remains closed.

Line 124 runs the power through a suitable cable into unit 30. The erase switch 36, when closed, connects line 124 to line 37 as aforedescribed. Conversely, switch 36, when opened, interrupts application of voltage to line 37. Voltage in line 37 is required for as long as voting is in progress, i.e., during the period of time assigned to the voting members for activating their voting switches.

After the voting and display of the voting has been completed and prior to the discussion of another point on the agenda, switch 36 is opened temporarily by the chairman, which opening places all the relays 61a, 61b, 62a, etc., in their unenergized states. As long as switch 36 is open, any manipulation with the voting buttons remains ineffective. When a new vote is being called for, switch 36 is closed by the chairman, and now power is applied to line 37 to become effective in the manner described above. Switch 36 can also be of the push-button type because the return of the entire network to zero or the normal state requires only a brief period of time, and the entire voting unit may optionally be set to receive power throughout the session, save for the brief periods of time in which the chairman, by temporarily activating button 36, returns the entire network to the normal state.

It can also be seen that line 124 is connected directly to the contacts that are governed by the absentee switches 32a, 32b, 32c, etc. This means that for any voting member who is absent, and for whom the respective absentee switch has been pressed, power is being supplied continuously to the respectively assigned lamp 31a, 31b, 31c, etc. throughout the procedure, and the illumination furnished by such a lamp is not being governed by switch 36 but only by switch 121, which is being opened at the end of the session.

The master push-button switch 34 is of primary importance. Switch 34, when closed, applies the power that is being applied to line 37 to a line 38 and to the energizing coil 101 of a master relay 100. This relay 100 may be structurally incorporated into the power unit 60, so that the chairman's unit 30 can be made small and flat, and it will comprise only switches and lamps. As soon as button 34 is depressed, the holding circuit for relay 100 is established through a contact blade 102 thereof connecting coil 101 directly to line 37. Thus, for energizing the relay 100, it is necessary only to temporarily close this button 34; and the relay 100 will be energized through its holding circuit for as long as switch 36 is not opened, since the holding circuit of relay 100 is also interruptable by switch 36.

After voting has been completed, the chairman presses his button 34 to initiate the display of the votes. As soon as button 34 is depressed, relay 100 responds and remains energized through its holding circuit. It further closes a second blade 103 applying the voltage that is being applied to line 37, to line 39. Thus, the master push-button 34 through the master relay 100 governs the application of power to the line 39, and it will be recalled that electric voltage in line 39 is required for the display lamps 42a, 42b, 43a, etc., to light up in the display unit. It will be recalled that one display lamp per voting member was being prepared by the vote units and the respectively associated relays, particularly the preparatory circuits thereof (blades 91, or 92, etc.).

Proceeding now to the description of the clerk's panel and record imprinter unit 50, again reference is being made to the first vote unit and the first vote member referred to above. It will be recalled that this clerk's panel and record imprinter 50 is a unit that is being installed separately and at a location that may or may not be visible to any of the voting members and/or the public at large. This unit may be positioned in front of the chairman, if desired, and may be operated by him. Alternatively, it is quite possible to have this unit provided in a separate office entirely outside of the assembly room.

It will be recalled further that to each voting member there is assigned another triplet of lamps, such as the vote-indicating lamps 52a, 53a, and 54a. These lamps are respectively connected electrically in parallel to lamps 42a, 43a, and 44a, and they will light up concurrently with the display of the votes.

This unit 50 additionally contains the imprinter solenoids, also as mentioned above, and it can be seen from the circuit diagram of FIG. 6 that in fact solenoids 55a, 56a, and 57a are respectively connected to the set of fourth contacts 91′, 92′ and 93′ of relays 61a, 62a, 63a. These contacts respectively connect their associated solenoids to a line 59 which is governed by a print or recording control switch 58. Switch 58 connects line 59 to line 39 which receives power only after master switch 34 has been actuated.

In operation, the record clerk must wait until the vote has been displayed. This fact is indicated to him by the lighting up of one lamp each of a set of lamps such as 52a, 53a, or 54a, and the other lamps on this panel. The illumination of the lamps of unit 50 follows the one initiated by the chairman upon actuating switch 34. Thus, the recording clerk, if any, is informed of the completion of the vote concurrently with the public.

After the display of the vote, and eventually on command of the chairman or as otherwise directed by him, the clerk presses the printing control switch 58, whereby a selected solenoid for each voting member is being energized, and a permanent print is obtained of the result of the voting.

As a safeguard, it might be advisable for the display board 40 also to be visible to the clerk, so that he can compare the illumination he sees on his panel with the one on the display panel in order to be sure that there is no discrepancy and that all circuits are operating properly. After he has assured himself that there is in fact no such discrepancy, he presses the printing switch 58 to make the permanent record. The record clerk may then inspect the record and signal to the chairman that the voting and recording are now completed.

At any time after the completion of the display and recording, the chairman presses the erasing switch 36 on his unit 30. The erasing switch 36 governs the holding circuits of all the relays and thus indirectly the energizing circuits of all the lamps in all the voting units as well as in units 40 and 50 and of the solenoids, since all these elements receive potential through the line 37 either directly or via the relay 100 and the line 39. When the push button 36 is being depressed for erasing, the voltage is removed from line 37, the relays in unit 60 de-energize, and accordingly the power is also removed from lines 39 and 59, so that all the lamps are extinguished. Only the initially energized lamps of column 31 on the control unit 30 and the panel thereof remain on, because they receive power directly through line 124 and throughout the session for as long as the switch 121 is closed. After the chairman has released the button 36, voting can be had anew at any time thereafter.

From the foregoing, it will be apparent that the voting system permits conduction of voting in a very orderly manner, and particularly in a manner which retains secrecy and privacy for each voting member as long as it takes to make his decision. He can make his decision and vote without knowing any of the votes cast by any of the other voting members. He can manipulate his voting switches for as long as he desires. He, but only he, is constantly aware of how he voted. However, once he has pressed one of the voting switches, there is an indication that he has in fact cast a vote. From that time on, the voting member has to observe when the chairman announces completion of the vote, because public display and subsequent recording of the vote is then imminent.

It will be recalled that the chairman notices the completion of the vote when his entire column of lights 31 is illuminated, since he has this control unit 30 in front of him. At any time thereafter, the chairman can then announce that the voting is completed, by which time it is inadvisable for the voting member to change his vote. After the chairman has pressed the master display button 34, the result of the voting will be displayed on the display panel 40. It will be observed that the circuit is of such a nature that, even after the voting result is displayed, a voting member can still change his vote. However, this will be observed publicly.

After the voting is completed, which may be determined by a ruling of the chairman that no more vote changes are permitted, the clerk will prepare a permanent record of the voting by pressing his printing control switch 58. Thereafter the chairman presses the erase switch 36, and the voting of the particular point discussed previously is now being completed.

It will also be recalled that, if switch 36 is a pushbutton pressed only temporarily, which is a preferable mode of construction, any voting member can vote at any time throughout the discussion of a particular point on the agenda. During this period of time, he can, of course, also change his vote, as stated. But it is a specific advantage offered by this system that the establishing of a specific voting period is not required. Voting can occur throughout the discussion, and it is only necessary that during the discussion the chairman observes whether all of the members have in fact voted.

The system as described is susceptible to modifications. For example, each vote unit as described is equipped with three vote switches, and the several units 30, 40, etc., are equipped accordingly to register three different types of votes per voting member. A simplified unit might dispense with the abstentious vote, in which case concurrent activation of the "yes" and the "no" switch in a vote unit serves as an abstentious vote. A vote unit such as the one identified by suffix letter —c can be employed here, but elements 12c, 15c, 62c, and 43c are then to be eliminated therefrom.

The invention is not limited to the embodiments described above, but all changes and modifications thereof not constituting departures from the spirit and scope of the invention are intended to be covered by the following claims.

I claim:
1. A voting system comprising:
 a plurality of vote units, each unit including selectively operable switching means for establishing a plurality of different circuits and including a first switching means for establishing a first circuit representing an affirmative vote, a second switching means for establishing a second circuit representing a disaffirmative vote, and a third switching means for establishing a third circuit representing an abstentious vote, the switching means in each vote unit being operable independently and in any order;
 a display panel including conspicuously visible illuminating means permitting a distinguishable first, second, and third indication of voting by means of said first, second and third switching means, respectively, of each voting unit, said illuminating means being connected to be responsive to the selective establishing of each of said first, second, and third circuits in each of said vote units, so that with each selection only one of said first, second, and third indications per vote unit is being prepared;
 a plurality of indicators, one for association with each vote unit and being individually connected to the switching means of each vote unit to provide a visual representation of the establishing of one of the first, second or third circuits in the respective vote unit and independently from the particular one of the first, second or third circuits as established in the respective vote unit, so that the indicator of the respective vote unit provides the same representation regardless whether the first, second or third circuit has been established in the respective vote unit; and
 a control unit connected for concurrently applying electrical power to all said illuminating means on said display panel for establishing one of said first, second, and third indications per vote unit as selected respectively by one of said first, second, and third switching means of each vote unit, and independently from the order in which said circuits in said vote units have been established.

2. A voting system comprising:
 a plurality of vote units, each unit including selective switching means permitting the establishing of a plurality of circuits corresponding to the number of different voting decisions made by a person operating an individual vote unit, each vote unit further including a common circuit established when any of the plurality of circuits in the unit has been established;

indicating lamps in each said unit and being mounted to restrict the range from which they can be seen, each indicating lamp in each of said units being assigned to signal the completion of the establishing of one of said plurality of circuits in the unit to which such and indicating lamp pertains;

indicating lamps external of said units and individually connected to said units to respectively provide an indication as soon as the common circuit in the respective unit has been established independently from the particular circuit in the unit that caused the establishing of the common circuit;

a display panel including visibly indicating and illuminating means capable of establishing distinct illumination for each different voting decision made with each different vote unit;

a preparatory circuit network connected to said vote units and to said illuminating means for selectively preparing said illuminating means in response to circuits as established in said vote unit; and a control unit for separate positioning in relation to said vote units and being connected to said preparatory circuit network for applying electrical energy to said illuminating means as selected by said vote units.

3. A vote display system comprising:

a plurality of individual vote units, each unit including selective switching means permitting the establishing of a plurality of circuits corresponding to the number of different voting decisions made by a person operating an individual vote unit, each of said vote units including shielded and inconspicuously visible illuminating means providing a distinct indication of the establishing of one of said plurality of circuits, each vote unit further including a common circuit established when any of the plurality of circuits in the unit has been established; indicating lamps external of said units and individually connected to said units to respectively provide an indication as soon as the common circuit in the respective unit has been established independently from the particular circuit in the unit that caused the establishing of the common circuit;

a display panel including conspicuously visible indicating and illuminating means capable of establishing distinct illumination for each different voting decision made with each different vote unit;

a preparatory circuit network connected to said vote units and to said illuminating means for selectively preparing one distinct illumination per vote unit for energization;

a control unit for separate positioning in relation to said vote units and said display panel and being connected to said preparatory circuit network for applying electrical energy to said illuminating means as selected by said vote units through said selective switching means.

4. A voting display and recording system comprising:

a plurality of individual vote units, each unit including selectively operable switching means for establishing a plurality of different circuits and including a first switching means for establishing a first circuit representing an affirmative vote, a second switching means for establishing a second circuit representative of a disaffirmative vote, each unit being independently operable;

a display panel including conspicuously visible illuminating means permitting a distinguishable first and second indication of voting by means of said first and second switching means, respectively, of each voting unit, said illuminating means being connected to be responsive to said selective establishing of one of said first and second circuits in each of said vote units, so that with each selection only one of said first and second indications per vote unit is being prepared;

a plurality of indicators, one for association with each vote unit and being individually connected to the switching means of each vote unit to provide a visual representation of the establishing of one of the first and second circuits and independently from the particular one of the first or second circuits as established in the respective vote unit, so that the indicator of the respective vote unit provides the same representation regardless whether the first or second circuit has been established in the respective vote unit;

a control unit connected for applying electrical power to said illuminating means of said display panel for establishing one of said first and second indications per vote unit as selected respectively by one of said first and second switching means of each vote unit; and a recording unit including means for providing a distinct permanent recording of the selection made with each of said vote units, said recording unit being connected to be responsive to the establishing of said first and second circuits in each of said vote units.

5. A voting display system comprising:

a plurality of individual vote units, each unit including selectively operable switching means for establishing a plurality of different circuits and including a first switching means for establishing a first circuit representative of an affirmative vote, a second switching means for establishing a second circuit representative of a disaffirmative vote, and a third switching means for establishing a third circuit representing an abstentious vote, each vote unit further including means connected for establishing a fourth circuit whenever any of said first, second, and third circuits have been established;

illuminating means permitting a distinguishable first, second, and third indication of voting by means of said first, second, and third switching means, respectively, of each voting unit, said illuminating means being connected to be responsive to the selective establishing of one of said first, second, and third circuits in each of said vote units, so that with each selection only one of said first, second, and third indications per vote unit is being prepared;

indicating means connected to each of said vote units to be responsive to the establishing of said fourth circuit in each said unit as soon as any of said first, second or third circuits has been established in the respective vote unit and providing and indication thereof, individual for each unit and independent from the particular one of the first, second or third circuits which has been established; and a control unit connected for applying electrical power to said illuminating means of said display panel for establishing one of said first, second, and third indications per vote unit as selected respectively by one of said first, second, and third switching means of each vote unit.

6. In a voting display and recording system, the combination comprising:

a vote unit having at least two individually activatable vote switches;

at least two inconspicuously positioned indicating lamps in said vote unit respectively connected for individual energization upon activation of one of said switches of said vote unit;

at least two relays connected for energization respectively by said switches;

at least two preparatory circuits connected so that each said relay individually governs one of said preparatory circuits;

at least two conspicuously positionable display lamps connected to said preparatory circuits for individual preparation for energization;

a master switching device connected for applying power to the display lamp as prepared for energization by one of said vote switches and the respectively associated relay;

at least two solenoids provided for individual energization upon energization of one of said relays; and circuit means connect to be energized upon energization of either one of the two relays; an indicator lamp connected to be energized upon energization of the circuit means to provide an indication that one of the two relays has been energized independently from the operation of said master switching device.

7. A voting display system comprising:

a plurality of sets of vote switches, each set including at least two individually operable switches;

a plurality of relays connected for individual energization by said voting switches;

a plurality of preparatory circuits connected so that each relay when energized enables one of said preparatory circuits;

a plurality of conspicuously placed indicating and illuminating means including lamps individually connected to said preparatory circuits;

a recording means including recording solenoids individually connected to operate in parallel with said illuminating means;

a master switching device connected to concurrently apply power through said preparatory circuits as enabled by said relays, so that lamps and solenoids respectively associated with said vote switches are being energized; and circuit means connected to be energized upon energization of either one of the relays pertaining to the vote switches of a set;

an indicator lamp connected to be energized upon energization of the circuit means to provide an indication that one of the relays pertaining to the vote switches of a set has been energized independently from the operation of said master switching device.

8. A voting display system, comprising:

a plurality of sets of vote switches, each set including at least two individually operable switches;

a plurality of relays, each one connected for energization by a vote switch, there being a holding circuit for each of said relays, each relay having at least one operating contact;

a master erase switch connected for governing power supply to all of said holding circuits;

a plurality of sets of inconspicuously positioned lamps, one for each vote switch, and being concurrently energized with the actuation of the respectively associated vote switch;

a plurality of conspicuously displayed lamps, at least one for each vote switch, and being governed respectively by said operating contacts of said relays;

a master control switch connected to apply power to all those conspicuously displayed lamps whose associated relays have been energized by said vote switches; and circuit means connected to be energized upon energization of either one of the relays pertaining to the vote switches of a set; an indicator lamp connected to be energized upon energization of the circuit means to provide an indication that one of the relays pertaining to the vote switches of a set has been energized independently from the operation of said master switching device.

9. A voting system, comprising:

a plurality of sets of vote switches, each set including at least two individually operable switches;

a plurality of relays, each one connected for energization by a vote switch, there being a holding circuit for each of said relays, each relay having two operating contacts, a first one of said operating contacts of the relays pertaining to a set of vote switches being connected to establish a common circuit, there being a plurality of such common circuits, equal to the number of the sets of voting switches;

a plurality of sets of inconspicuously positioned lamps, one for each vote switch, each inconspicuously positioned lamp being energized upon activation of its associated vote switch, each set of said lamps and the respectively associated set of vote switches being mounted to provide a vote unit;

indicating means to be positioned remotely from said vote units, and being connected to be individually responsive to the establishing of each of said common circuits;

a display panel including a plurality of sets of conspicuously displayed lamps, there being at least one lamp for each vote switch;

a preparatory circuit for each display lamp governed by a second one of said operating contacts of each of said relays, so that each relay when energized prepares an energization circuit for the respectively associated conspicuously displayed lamp; and master control switching means positioned remotely from at least one of said vote units and connected for applying electrical energy to each prepared display lamp.

10. A voting system as set forth in claim 9 and including in addition a plurality of sets of solenoids and a recording means, each solenoid being connected for energization concurrently to the energization of a display lamp, there being an additional switch permitting solenoid energization subsequent to the activation of said master control switching means.

11. A voting system as set forth in claim 9, each set of lamps in a vote unit being positioned in a well providing a limited range of visibility of such lamps.

12. In the voting system as set forth in claim 9, each said vote unit being comprised of a housing for the respectively associated set of vote switches and inconspicuously placed lamps, said vote switches being positioned in the rear of such a housing, opposite to the normal position of a person operating such switches.

13. In a voting display system, the combination comprising:

a vote unit having three individually activatable vote switches arranged side by side, there being respectively two pairs of juxtaposed vote switches, and two of the three vote switches are outer vote switches;

three inconspicuously positioned indicating lamps in said vote unit respectively connected for individual energization upon activation of one of said switches of said vote unit and including circuit means permitting concurrent energization of respective two lamps if two juxtaposed vote switches are pressed concurrently but preventing concurrent energization of two lamps respectively operated by the two outer vote switches;

three relays connected for respective individual energization by operation of said vote switches, each relay being equipped with a holding circuit, with an operating circuit and with circuit means preventing concurred energization of relays pertaining to the two outer vote switches;

three conspicuously positionable display lamps individually connected for preparation by said operating circuits of said relays;

a master switching device connected for applying power to the display lamp as prepared for energization by one of said vote switches and the respectively associated relay; and a second remotely positionable switching device for interrupting said holding circuit of said relays.

14. In a voting display system as set forth in claim 13, said vote switches being connected to said relays in that each vote switch governs additionally the holding circuits of all additional relays respectively associated with the unit to which said latter vote switch pertains.

15. In a voting display system as set forth in claim 13, said vote unit additionally being equipped with a switch governing said holding circuit.

References Cited by the Examiner

UNITED STATES PATENTS

| | | | |
|---|---|---|---|
| 1,219,053 | 3/1917 | Thompson | 235—52 |
| 1,420,879 | 6/1922 | Sproat | 235—52 X |
| 1,650,247 | 11/1927 | Turck | 235—52 |
| 1,773,891 | 8/1930 | Thompson | 235—52 |
| 2,219,347 | 10/1940 | Thompson | 235—52 |

FOREIGN PATENTS 451,143  7/1936  England.

NEIL C. READ, *Primary Examiner.*

R. M. GOLDMAN, *Assistant Examiner.*